A. HOLLENHORST.
PLOWSHARE FRAME.
APPLICATION FILED SEPT. 6, 1918.

1,302,555. Patented May 6, 1919.

Witness
L. N. Gillis

Inventor
A. Hollenhorst,
By Chandler & Chandler
Attorney

UNITED STATES PATENT OFFICE.

AUGUST HOLLENHORST, OF GREENWALD, MINNESOTA.

PLOWSHARE-FRAME.

1,302,555.	Specification of Letters Patent.	Patented May 6, 1919.

Application filed September 6, 1918. Serial No. 252,917.

*To all whom it may concern:*

Be it known that I, AUGUST HOLLENHORST, a citizen of the United States, residing at Greenwald, in the county of Stearns, State of Minnesota, have invented certain new and useful Improvements in Plowshare-Frames; and I do hereby declare the following to be a full, clear, and exact description of the invention, such as will enable others skilled in the art to which it appertains to make and use the same.

The invention relates to a plow share frame, and has for its primary object the provision of a device of this character, wherein any size, shape or style of lay or plow share can be clamped and held during the process of tempering the same and for the convenient dipping thereof in water without any possibility of the warping of said lay or share during the tempering.

Another object of the invention is the provision of a frame of this character, wherein the construction thereof permits the assemblage of the sections of said frame and the placing and clamping of the lay or share for the convenient handling thereof for the tempering and cooling of the same.

A further object of the invention is the provision of a frame of this character, which is simple in construction, strong, durable, efficient in its purpose and inexpensive to manufacture.

With these and other objects in view, the invention consists in the features of construction, combination and arrangement of parts as will be hereinafter fully described, illustrated in the accompanying drawing and pointed out in the claims hereunto appended.

In the accompanyng drawing.

Similar reference characters indicate corresponding parts throughout the several views in the drawing.

Figure 1:
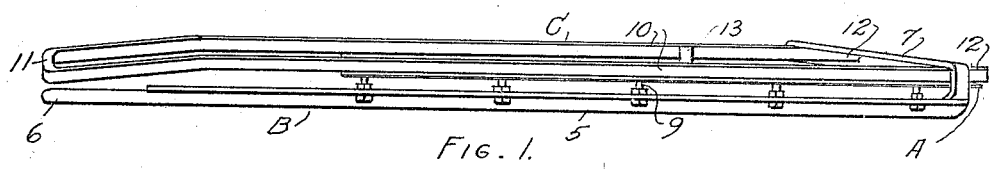
Figure 1, is a side elevation of a frame constructed in accordance with the invention showing the share held therein.
Figure 2:
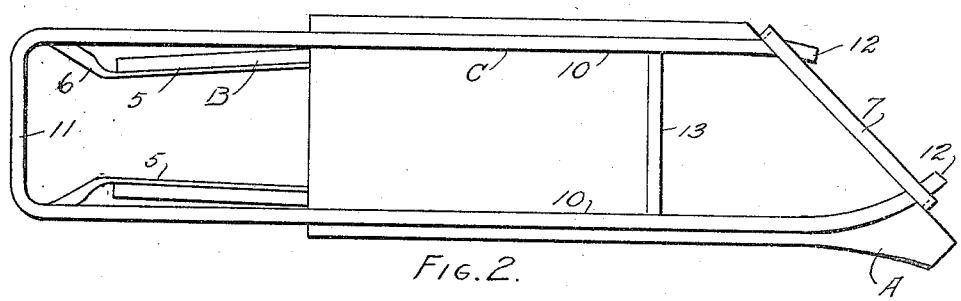
Fig. 2, is a plan view.
Figure 3:
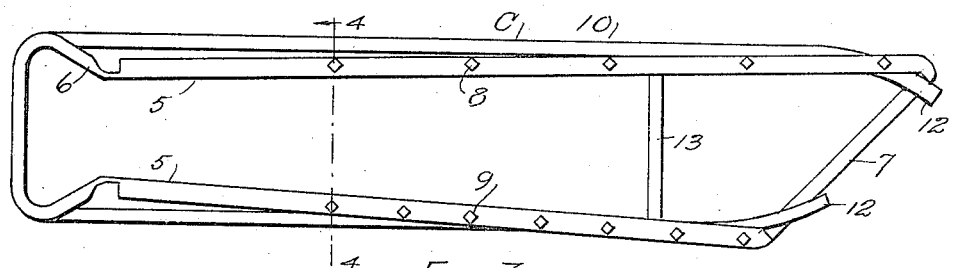
Fig. 3, is a similar view to Fig. 2, looking toward the opposite side.
Figure 4:
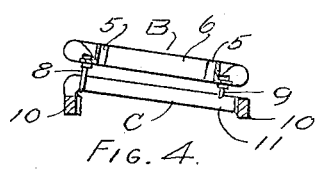
Fig. 4, is a section on the line 4—4 of Fig. 3.
Figure 5:
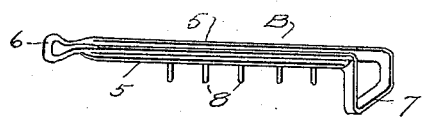
Fig. 5, is a perspective view of one section of the frame.
Figure 6:
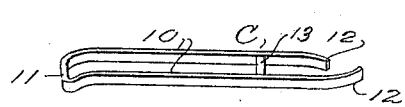
Fig. 6, is a perspective view of the other section thereof.

Referring to the drawing in detail, A, designates generally, a plow share or lay, adapted to be held within the frame which includes the sections B and C, respectively, for tempering and cooling the share, the sections of the frame being hereinafter fully described.

The section B, of the frame comprises spaced divergent side members 5 integral at one end with a loop handle 6, while at the other end is integrally formed an angular offset yoke 7 and in one of these side members 5 are bolted or otherwise fastened, spaced bearing pins 8, and likewise bolted or otherwise fastened in the other side member are spaced pins 9 which are of considerably less length than the pins 8 and against these pins rest the plow share or lay A to be tempered and cooled.

Section C, of the frame comprises spaced parallel side members 10 integrally formed with a loop handle 11 which together with the side members 10 are of substantially U-shape, while the free ends of the side members 10 are tapered and slightly inwardly converged to form yoke engaging extremities 12, the said members being prevented from spreading through the medium of a cross brace 13 fastened thereto, and this section C clamps the share or lay A between it and the section B so as to hold the share against warping during the tempering process while it is heated to red heat and on the cooling thereof by dipping the share or lay in water.

The extremities 12 of the section C engage in the yoke 7 and by pressing the sections B and C together at the handle ends the share or lay A is clamped upon the pins 8 and 9 which are of the required length to seat the share or lay accordingly to its conformation or shape.

On spreading apart the sections B and C, of the frame, the share or lay can be readily removed.

From the foregoing it is thought that the construction and manner of use of the share or lay will be clearly understood and therefore a more extended explanation has been omitted.

What is claimed is:

1. A device of the character described comprising a pair of opened frame sections, one frame being formed with an offset yoke and the other frame being substantially U-shaped and having its ends removably engaged in the yoke, and a plurality of seating pins carried by the side limbs of one of the frame sections.

2. A device of the character described comprising a pair of opened frame sections, one frame being formed with an offset yoke and the other frame being substantially U-shaped and having its ends removably engaged in the yoke, a plurality of seating pins carried by the side limbs of one of the frame sections, and looped handles on the frame sections for the bringing of the sections together or the spreading thereof when engaged with each other.

In testimony whereof, I affix my signature, in the presence of two witnesses.

AUGUST HOLLENHORST.

Witnesses:
 CARL SCHONHARDT,
 JOHN OLBERDING.

Copies of this patent may be obtained for five cents each, by addressing the "Commissioner of Patents, Washington, D. C."